United States Patent [19]

Mooney

[11] Patent Number: 4,522,361

[45] Date of Patent: Jun. 11, 1985

[54] LOCKING SPREADER LEG FOR TRIPOD

[76] Inventor: Paul C. Mooney, c/o Quick Set, Inc., 3650 Woodhead Dr., Northbrook, Ill. 60062

[21] Appl. No.: 442,852

[22] Filed: Nov. 18, 1982

[51] Int. Cl.³ .............................................. A47B 91/00
[52] U.S. Cl. .................................. 248/188.8; 248/411; 248/316.4
[58] Field of Search ................ 248/188.8, 168, 316 A, 248/188.1, 188.2, 188.5, 180, 170, 414, 411, 161; 403/109, 104, 365, 372, 325, 322, 366

[56] References Cited

U.S. PATENT DOCUMENTS

| | | | |
|---|---|---|---|
| 2,546,492 | 3/1951 | Booth | 248/188.8 |
| 2,668,682 | 2/1954 | Dalton | 248/188.5 |
| 2,699,668 | 1/1955 | Stein | 248/188.1 |
| 3,030,060 | 4/1962 | Breuer | 248/316 A |
| 3,051,425 | 8/1962 | Homrighausen | 248/180 |
| 3,379,398 | 4/1968 | Boccone | 248/188 |
| 3,544,049 | 12/1970 | Brown et al. | 248/316 A |
| 4,104,000 | 8/1978 | Fleischmann | 403/109 |
| 4,174,900 | 11/1979 | Ina | 403/109 |
| 4,329,076 | 5/1982 | Coreth | 403/109 |

OTHER PUBLICATIONS

Brochure entitled "Tripods".
Brochure entitled "Sachtler Motion Picture & Video Camera Support Systems".
Heiwa Brochure entitled "Tripod Photo-Cine & Video Accessories, 'The Sole Technique Since 1950'".

Primary Examiner—William H. Schultz
Assistant Examiner—Ramon O. Ramirez

[57] ABSTRACT

A locking mechanism for a first leg member telescopically received within a second leg member, including first and second clamps longitudinally fixed with respect to the second leg member. The second leg member has an opening which exposes a biasing surface of the first clamp and that surface engages a cam surface pivotable about an axis fixed to the second leg member, the cam surface thereby operable to bias the first and second clamps together to engage the first leg member.

12 Claims, 6 Drawing Figures

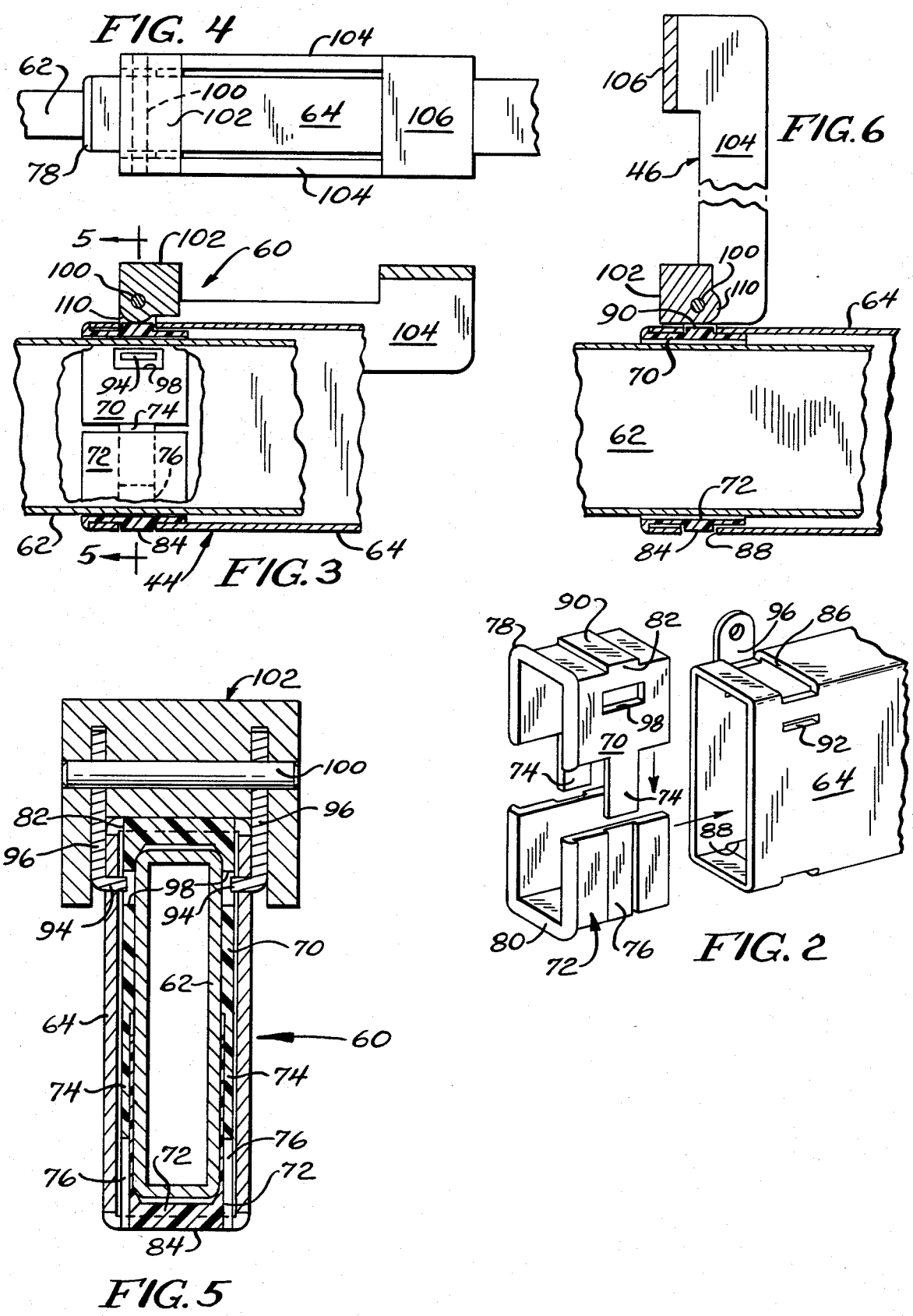

LOCKING SPREADER LEG FOR TRIPOD

FIELD OF THE INVENTION

This invention relates to a mechanism for locking a telescoping leg and more particularly to a mechanism for locking a spreader leg for use with a tripod.

BACKGROUND OF THE INVENTION

Tripods are used extensively today to support expensive equipment, including a wide range of types of cameras. Since however tripod legs are pivotable about a tripod plate, in some cases (as when placed on a smooth surface) there is a need to restrain the legs to prevent them from sliding outward. Spreaders and dollies have been used for this purpose.

Spreaders and dollies are basically flat three legged apparatuses, the legs of which are adjustable and which are connected to the tripod legs to hold them together and thereby prevent them from sliding outwardly.

In many uses, it is important that the tripod with its spreader be able to be very quickly and easily set up. This is particularly true in such cases as portable television news units where pictures must be obtained right away.

Mechanisms in the prior art for locking the adjusting legs at a desired length have presented an assortment of disadvantages. For example, many of the prior art mechanisms use knobs or twisting devices which during use can strip, jam up and in cold weather even freeze up. Even when properly operated, these mechanisms are still generally slow to lock and in many cases not sturdy or reliable enough for use with a tripod supporting heavy loads. Such characteristics are particularly disadvantageous when a quick set up is required for heavy loads in any kind of weather, as when used with portable news cameras in the field. Also, such prior art mechanisms have required considerable manual force to be applied to lock them firmly. Still further, some prior art mechanisms have components which can be impacted and damaged during handling, as for example, when thrown and bounced around during transport and before and after use.

The present invention is directed toward overcoming one or more of the problems as set forth above.

SUMMARY OF THE INVENTION

In one aspect of the present invention, a locking mechanism for telescoping leg members is described. More specifically, a first leg member is telescopically received within a second leg member and first and second clamps longitudinally fixed with respect to the second leg member. The second leg member has an opening which exposes a biasing surface of the first clamp and that surface engages a cam surface pivotable about an axis fixed to the second leg member, the cam surface thereby operable to bias the first and second clamps together to engage the first leg member.

One object of the present invention is to provide an adjustable spreader leg and locking mechanism which are sturdy enough to withstand the loads incurred and which may still be easily and simply unlocked and locked for quick set up and adjustment. Another object of the present invention is to provide a locking mechanism for a spreader leg which works reliably under all conditions. A further object of the present invention is to provide an adjustable spreader leg and locking mechanism in which the working components are protected from damage in handling. Still another object of the present invention is to provide a locking mechanism which may be operated with minimal effort.

BRIEF DESCRIPTION OF THE DRAWINGS

FIG. 2 is an exploded view of a portion of the locking mechanism;

FIG. 3 is a plan cross-sectional view of the locking mechanism;

FIG. 4 is an elevational view of the locking mechanism;

FIG. 5 is a cross-sectional view taken along line 5—5 of FIG. 3; and

FIG. 6 is a cross-sectional view of the locking mechanism shown in the unlocked position.

DESCRIPTION OF THE PREFERRED EMBODIMENT

Figure 1:
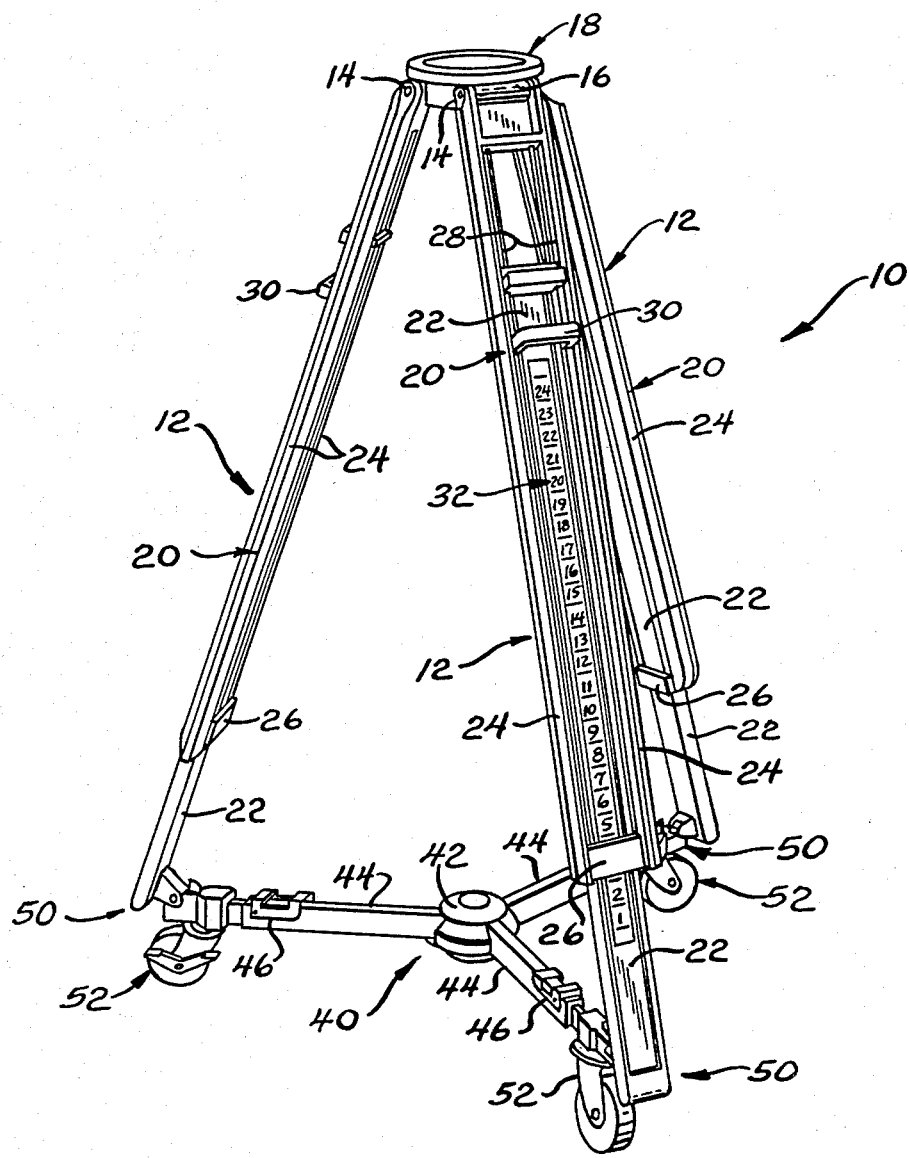
FIG. 1 is a perspective view of a tripod with a dolly having the present invention.

A tripod 10 having locking legs 12 is shown in perspective in FIG. 1. The legs 12 are pivotably secured in a suitable manner, such as a pin 14 in a sleeve 16, to the tripod plate 18. The type of tripod plate 18 used may differ depending on the intended use, with the tripod plate 18 shown in FIG. 1 being capable of fixing a portable television or film camera.

Each leg 12 has a fixed leg member 20 and a sliding leg member 22. The fixed leg member 20 has a pair of track members 24 which are interconnected at the top and bottom so as to be maintained in a parallel relationship. The interconnection of the track members 24 at the bottom comprises a pair of spaced guiding plates 26 which, together with the track members 24, define a rectangular opening (not seen in the figures). The track members 24 also include V-groove tracks 28 as will be more fully described hereafter.

The sliding leg member 22 slides within the defined rectangular opening of the fixed leg member 20 and is guided at its upper end along the V-groove tracks 28 of the track members 24. The upper end of the sliding leg member 22 not only guides the sliding leg member 22 but it also includes a handle 30 for operating a clamping mechanism which fixes the two leg members 20,22 together. Details of this mechanism are set forth more fully hereafter.

Accordingly, the two leg members 20,22 may be adjusted axially with respect to one another in an essentially telescopic fashion so as to permit adjustment of the overall length of the leg 12. A scale 32 is provided on each sliding leg member 22 to aid in adjusting the overall length of the three legs 12 as desired.

One material which has been found to be suitable for these components is Zytel, a tough, high strength nylon resin made by E. I. du Pont de Nemours & Co. Inc. of Wilmington, Del.

The tripod 10 as shown also includes a dolly or spreader 40 (a dolly is a spreader with wheels). The tripod 10 can of course be used without a dolly 40. However, in certain uses, particularly on hard, smooth surfaces, the dolly 40 is desirable since it can hold the legs 12 together so as to prevent them from sliding apart and further can be used to support the entire tripod 10 for movement across the surface.

The dolly 40 shown includes a hub 42 from which three spreader legs 44 project. The spreader legs 44 are telescopic to permit adjustment of their lengths, each spreader leg 44 having a locking mechanism with an easily accessible handle 46. At the end of each spreader leg 44 is a snap-lock pushbutton release mechanism 50 which enables the tripod legs 12 to be easily connected to and disconnected from the dolly 40. The locking and release mechanism 50 of each speader leg 44 also includes a wheel or caster 52 on which the entire apparatus may be rolled.

The spreader leg locking mechanism 60 which is the subject of the present disclosure is shown in detail in FIGS. 2-6. The spreader leg 44 consists of telescoping inner and outer leg members 62,64 which enable the length of the spreader leg 44 to be adjusted as necessary and then fixed in that position by the locking mechanism 60.

The locking mechanism 60 includes U-shaped upper and lower clamps 70,72 shown best in FIG. 2. The upper clamp 70 includes a pair of downwardly depending legs 74 which mate with slots 76 in the lower clamp 72, thereby permitting the upper and lower clamps 70,72 to be moved together and apart while restraining any relative motion longitudinally of the spreader legs 44. To restrain the clamps 70,72 within the outer leg member 64, each clamp 70,72 has a lip 78,80 which abuts against the end of the outer leg member 64. Each clamp 70,72 further has an outer flange 82,84 which projects into matching rectangular openings 86,88 in the top and bottom of the outer leg member 64. The top of the flange 82 on the upper clamp 70 defines a biasing surface 90 as will be further described hereafter.

Both sides of the outer leg member 64 also include slots 92 into which the bottom leg 94 of L-shaped brackets 96 extend (best seen in FIGS. 2 and 5). The bottom leg 94 preferably projects partially into the interior of the outer leg member 64 and thus the upper clamp 70 includes slots 98 to ensure that the upper clamp 70 is free to move up and down without interference from the brackets 96.

Alternately, the two brackets 96 may comprise a single U-shaped bracket (not shown) positioned around the outer leg member 64. The bottom of the U-shaped bracket would be in the bottom rectangular opening 88 of the outer leg member 64, engaging the flange 84 of the lower clamp 72, and would thereby be held longitudinally with respect to the leg 44.

A laterally disposed hinge pin 100 extends through the brackets 96. The hinge pin 100 pivotably supports the leg clamping member 102.

The leg clamping member 102 includes a semi-recessed handle 46, which consists of a pair of L-shaped legs 104 interconnected by a handle member 106 (see FIGS. 3, 4 and 6). This handle 46 is thus out of way when in the clamped position so that it will not break off on impact and yet can be easily used even when wearing bulky gloves.

The leg clamping member 102 also includes a cam surface 110 (best seen in FIGS. 3 and 6) which abuts against the biasing surface 90. The cam surface 110 is shaped so that its maximum radius point contacts the biasing surface 90 with the handle 46 slightly raised from the locked position. Accordingly, the springback force of the upper clamp 70 operates to engage the cam surface 110 in an overcenter manner to positively hold the handle 46 in its locked position.

The locking mechanism 60 is shown in the clamped and locked position in FIGS. 3-5. With the handle 46 down, the cam surface 110 of the leg clamping member 102 engages the biasing surface 90 of the upper clamp 70, biasing the upper clamp 70 down toward the lower clamp 72, thereby squeezing the inner leg member 62 to frictionally hold the inner leg member 62 with respect to the outer leg member 64.

As shown best in FIG. 5, the clamps 70,72 have an angular interior surface. Therefore, the frictional clamping force is applied by the action of the corners of the clamps 70,72 on the corners of the inner leg member 62. When these squared off corners are biased against the inner leg member 62, they deform somewhat to ensure a good frictional contact between the clamps 70,72 and the inner leg member 62 and to permit positive clamping of the mechanism 60 with the handle 46 fully down. Also, the angular corners have an effective radius greater than the corners of the inner leg member 62, thereby providing a wedge effect in which the normal force on the corners (which determines the frictional force between the clamps 70,72 and the inner leg member 62) is greater than the force biasing the clamps 70,72 together. Accordingly, a large normal force (and thus large frictional force) may be introduced even with a relatively small force biasing the clamps 70,72 together.

To release the locking mechanism 60, the handle 46 is pivoted up to the position shown in FIG. 6. The cam surface 110 retracts from the biasing surface 90 of the upper clamp 70, thereby causing the clamps 70,72 to release the inner leg member 62. The clamps 70,72 still however enclosed the inner leg member 62 so as to guide the inner leg member 62 as it is telescoped in or out of the outer leg member 64. Once the leg 44 is at the desired length, the handle 46 may then be pivoted back down to lock the mechanism 60 and thereby fix the leg 44 at that length.

Although the above described embodiment is preferred, alternative structures for biasing the clamps 70,72 together, such as a screw, could be used and will be apparent to those skilled in the art.

This locking mechanism thus enables a spreader leg 44 to be quickly and easily adjusted to virtually any desired length. The handle has positive locked and unlocked positions, further simplifying operation. At the same time, the mechanism provides a sturdy clamping which enables the spreader 40 to be used to support tripods 10 having heavy loads.

Other aspects, objects and advantages of this invention can be obtained from a study of the drawings, the disclosure and the appended claims.

I claim:

1. A locking mechanism for first and second telescoping leg members, said first leg member telescopically received within said second leg member, comprising:
   first and second clamps within and longitudinally fixed with respect to said second leg member, said first leg member being received between said first and second clamps; and
   means associated with said clamps for selectively either releasing said clamps to allow relative longitudinal motion of said leg members, or biasing said clamps together into frictional contact around said first leg member to prevent relative longitudinal motion of said leg members.

2. The locking mechanism of claim 1 wherein said second leg member has an opening opposite said second clamp and exposing a biasing surface of said first clamp, and said biasing means comprises a cam surface pivotable about an axis fixed with respect to said second leg member, said cam surface engaging said biasing surface to bias said first clamp toward said second clamp to engage both of said clamps with said first leg member.

3. The locking mechanism of claim 2, wherein said biasing surface extends into said second leg member opening to longitudinally fix said first clamp, and further including a flange on said second clamp extending into a second opening in said second leg member to longitudinally fix said second clamp.

4. The locking mechanism of claim 1, wherein said clamps have inner surfaces conforming generally to the outer surface of said first leg member, the inner surface of said clamps frictionally contacting said first leg member being disposed at an acute angle with respect to the force introduced by said biasing means.

5. The locking mechanism of claim 4, wherein said leg members are rectangular in cross-section and the inner surfaces of said clamps are U-shaped with the radii of the inner surface corners greater than the radii of the corners of said first leg member.

6. The locking mechanism of claim 1, further including an interengaging slot and leg assembly on said first and second clamps to longitudinally fix said clamps with respect to each other while permitting biasing of said clamps together.

7. The locking mechanism of claim 2, further comprising a bracket fixed to said second leg member and securing a hinge pin defining said cam surface axis.

8. The locking mechanism of claim 2, further comprising a pivotable handle for said cam surface semi-recessed with respect to said leg members when said handle is in a locking position.

9. The locking mechanism of claim 1, wherein said leg members comprise a spreader leg for use with a tripod.

10. A locking mechanism for first and second telescoping leg members, said first leg member telescopically received within said second leg member, comprising:

first and second clamps within and longitudinally fixed with respect to said second leg member, said first leg member being received between said first and second clamps;

a cam member pivotable about an axis fixed with respect to the second leg member, said cam member engaging said first clamp through an opening in said second clamp, whereby said cam member may be pivoted between a first position biasing the first clamp toward the second clamp to frictionally grasp the first leg member therebetween and a second position releasing the first clamp to allow free motion of the first leg member between the clamps and within the second leg member.

11. The locking mechanism of claim 10, further comprising a bracket fixed to the second leg member and securing a hinge pin defining the pivot axis.

12. The locking mechanism of claim 10 wherein the cam member has a cam surface having a portion at a maximum radius from the pivot axis, and said cam surface portion engages the first clamp when the cam member is between the first and second positions so that the cam member is positively held in its locked position.

* * * * *